(12) United States Patent
Zimmerman

(10) Patent No.: US 9,119,083 B2
(45) Date of Patent: Aug. 25, 2015

(54) MASTER ANTENNA CONTROLLER APPLICATION AND DEVICE

(71) Applicant: Andrew LLC, Hickory, NC (US)

(72) Inventor: Martin L. Zimmerman, Chicago, IL (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 342 days.

(21) Appl. No.: 13/782,756

(22) Filed: Mar. 1, 2013

(65) Prior Publication Data

US 2013/0231152 A1 Sep. 5, 2013

Related U.S. Application Data

(60) Provisional application No. 61/606,024, filed on Mar. 2, 2012.

(51) Int. Cl.
*H04B 7/00* (2006.01)
*H04W 24/02* (2009.01)
(Continued)

(52) U.S. Cl.
CPC ............... *H04W 24/02* (2013.01); *H01Q 1/246* (2013.01); *H01Q 3/005* (2013.01); *H04W 4/008* (2013.01)

(58) Field of Classification Search
CPC ................................................... G06K 7/1096
USPC ......... 455/517, 500, 562.1, 550.1, 41.1–41.3, 455/418–420, 422.1, 403, 426.1, 426.2, 455/414.1–414.4, 412.1, 412.2, 445, 455/423–425, 67.11; 235/494, 462.1, 235/462.45, 462.14; 370/310, 241, 242, 370/246, 247, 252, 328, 329, 343, 315
See application file for complete search history.

(56) References Cited

U.S. PATENT DOCUMENTS

| | | | |
|---|---|---|---|
| 6,864,837 B2 | 3/2005 | Runyon et al. | |
| 7,013,329 B1 * | 3/2006 | Paul et al. | 709/217 |
| 2008/0291116 A1 | 11/2008 | Le et al. | |
| 2009/0040106 A1 | 2/2009 | Le et al. | |

(Continued)

FOREIGN PATENT DOCUMENTS

| | | |
|---|---|---|
| CN | 1 988 703 | 6/2007 |
| KR | 2008 0033585 | 4/2008 |

(Continued)

OTHER PUBLICATIONS

PCT International Search Report for related PCT App. No. PCT/US2013/028855 dated Sep. 30, 2013.

(Continued)

*Primary Examiner* — Keith Ferguson
(74) *Attorney, Agent, or Firm* — Husch Blackwell LLP

(57) ABSTRACT

A Master Antenna Controller System comprises a handheld wireless device and an AISG equipment controller. The handheld wireless device may comprise an Android OS or iOS based smartphone or tablet that includes Wi-Fi capabilities communications capabilities. The equipment controller may provide full RET control based on the AISG 1.1 and 2.0 standards and communicate with the handheld wireless device via a Wi-Fi server. The combination may be configured to provide extensive, screen-guided, intuitive RET diagnostics functionality. The RET diagnostics functionality may include measurements of voltage, current, and AISG protocol commands. The equipment controller itself may also include multiple different pre-defined tests (e.g. test one actuator, test one RET cable, test AISG signal from TMA) and also some standard electrical tests, e.g. measuring voltage, current etc. Additional higher-level functions may be provided on an Application on the handheld wireless device and communicated to the equipment controller wirelessly or by USB connection.

18 Claims, 9 Drawing Sheets

(51) Int. Cl.
  *H01Q 1/24* (2006.01)
  *H01Q 3/00* (2006.01)
  *H04W 4/00* (2009.01)

(56) References Cited

U.S. PATENT DOCUMENTS

2009/0061941 A1\* 3/2009 Clark .......................... 455/562.1
2011/0105099 A1\* 5/2011 Roll .............................. 455/418

FOREIGN PATENT DOCUMENTS

WO   WO 2006/056886   6/2006
WO   WO 2011/047322   4/2011

OTHER PUBLICATIONS

International Preliminary Report on Patentability regarding PCT/US2013/028855, mailed Sep. 12, 2014 (16 pgs.).

\* cited by examiner

MASTER ANTENNA CONTROLLER APPLICATION AND DEVICE

BACKGROUND

Currently many wireless operators use RET (remote electrical tilt) antennas. RET antennas allow wireless operators to remotely control the beam attributes, including, for example, beam direction, of one or more antennas.

Typically, the RET antenna beam attributes are adjusted using motors or actuators according to specifications promulgated by the Antenna Interface Standards Group (AISG). Relevant specifications may be found at http://www.aisg.org.uk (incorporated by reference). While the use of RET antennas has proved advantageous, the setup of such antennas currently requires considerable effort. In order to setup, troubleshoot, and control RET antennas, several different portable controllers may be required. For example, when trouble-shooting RET antenna configurations, crews currently depend on separate electrical measurement and troubleshooting devices which are difficult to use. Additionally crews are often overwhelmed and do not know how to trouble-shoot RET configurations.

One disadvantage of known configuration methods is the potential for introducing error. Typically, a technician must determine the model and/or serial number of the equipment to be configured, select that equipment from a list on a controller, determine appropriate configuration parameters based on the model/serial number, and then manually key in the configuration parameters. Each part of the process has the potential to introduce error. For example, the model and/or serial number may be mis-read, the wrong equipment may be selected on the controller, configuration parameters for an incorrect model and/or serial number may be retrieved, and there may be error in inputting the configuration parameters.

When technician crews are on site, wireless operators require the technician crews to provide "close-out-packages" to the wireless operators as a proof of work. See, e.g., U.S. application Ser. No. 12/905,733, with a filing date of Oct. 15, 2010, the disclosure of which is incorporated by reference. A close out package is a key deliverable. Especially during a new installation, preparation of a close out package involves a substantial amount of effort. Currently, technician crews must capture screenshots of controller windows (sometimes with using a camera), manually export selected data, and manually measure and record the location of the antenna with a GPS receiver. Often, the disparate sources of information are manually collected and written to a CD ROM or DVD ROM. Photographs of display screens may be saved in directories on the disks.

SUMMARY

A Master Antenna Controller System is provided herein. In one example, the Master Antenna Controller System comprises a handheld wireless device and an AISG equipment controller, such as a RET Master. The handheld wireless device may comprise an Android OS or iOS based smartphone or tablet that includes Wi-Fi capabilities communications capabilities. The equipment controller may provide full RET control based on the AISG 1.1 and 2.0 standards and communicate with the handheld wireless device via a Wi-Fi server. The combination may be configured to provide extensive, screen-guided, intuitive RET diagnostics functionality. The RET diagnostics functionality may include measurements of voltage, current, and AISG protocol commands. The equipment controller itself may also include multiple different pre-defined tests (e.g. test one actuator, test one RET cable, test AISG signal from TMA) and also some standard electrical tests, e.g. measuring voltage, current etc. Additional higher-level functions may be provided on an Application on the handheld wireless device and communicated to the equipment controller wirelessly or by USB connection. The Application on the handheld wireless device may also guide user about how to test and what steps to do. The Application may also guide the user through several steps for an easy and quick trouble-shooting process.

The Master Antenna Controller System may include a Close-Out-Package Wizard, which will allow technician crews to create standardized close out packages with a few clicks. The Close-Out Package Wizard significantly reduces the time required of the technicians to prepare the close out packages. Also, the wizard provides a standardized the close out package format to ensure same format is used by all technician crews.

The equipment controller may be hand-held and battery powered which will allow using that unit on a tower. The handheld wireless device may have a touch-screen for easy handling on site. The handheld wireless device may also have a GPS receiver for easy location measurements. These location measurements may be included in the close out packages. Also, the GPS functionality and different user locations may be employed by the handheld device to perform the functions of an alignment tool for antenna azimuth direction.

DETAILED DESCRIPTION

Figure 1:
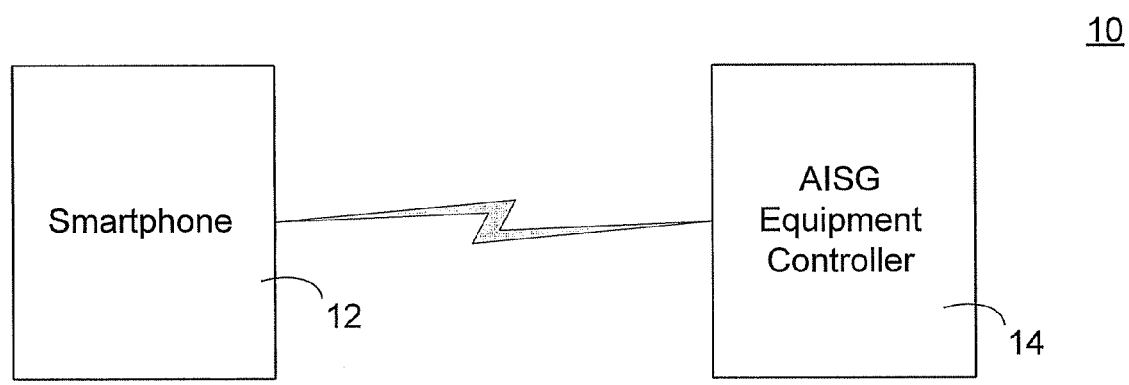
FIG. 1 is a view of a Master Antenna Controller System according to one example of the present invention.

A Master Antenna Controller System 10 according to one example, is illustrated in FIG. 1. The Master Antenna Controller System 10 includes a handheld wireless device 12 and an equipment controller 14. The Master Antenna Controller System 10 enables a technician to perforin initial setup testing, installation configuration, and troubleshooting diagnostics of all Antenna Line Devices, Remote Electrical Tilt Devices, and Tower Mounted Amplifier.

The equipment controller 14 is a portable AISG-compliant device capable of communicating with AISG controllers, such as RET controllers. The equipment controller 14 is preferably small in size and operable from a battery or a wall plug-in power supply. In one example, the equipment controller 14 has a processor and supporting hardware sufficient to operate a basic operating system and effect communications between tower mounted devices and the handheld wireless device 12. Other operating systems suitable for handheld or portable devices may also be used. The equipment controller 14 includes enough non-volatile memory storage to hold the operating system footprint, AISG protocol stack, and preferably room for future growth. The handheld wireless device has memory to store antenna configuration files.

Figure 2A:
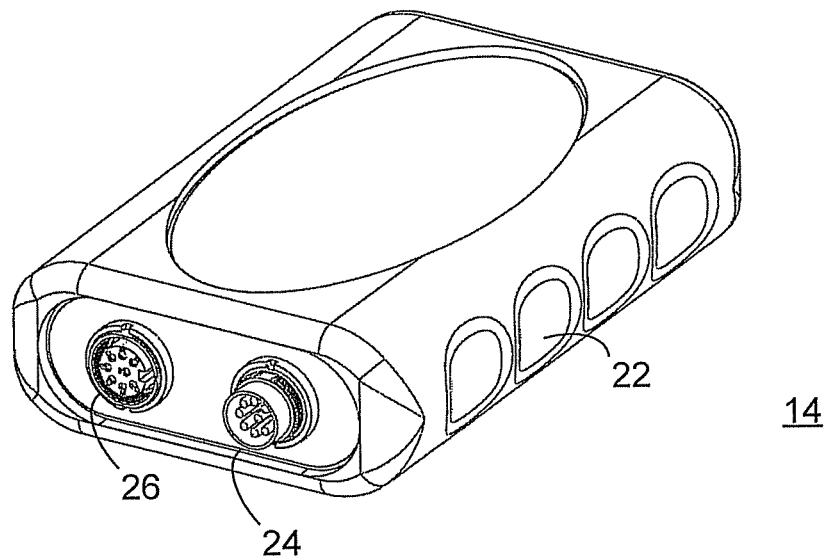
FIG. 2a is a view of an equipment controller according to one example of the present invention.
Figure 2B:
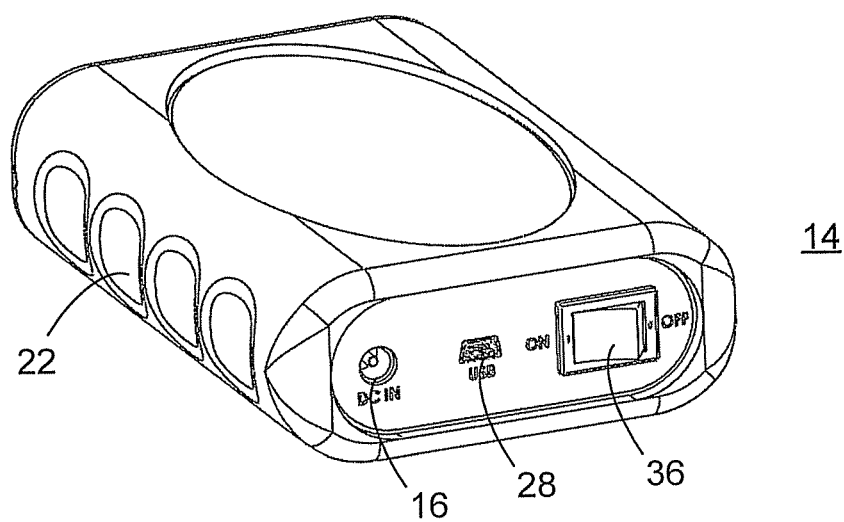
FIG. 2b is another view of an equipment controller according to one example of the present invention.

Exterior views of one example for equipment controller 14 are provided in FIGS. 2a and 2b. The equipment controller 14 of this example includes a power connector 16 for receiving DC power from an external power source, such as an AIC wall power supply and charger (not shown). optionally, a status LED (not shown) may be included. Grips 22 may be provided for ease of holding the equipment controller 14 in use. Male AISG connector 24 and female AISG connector 26 are provided. A USB port 28 may be provided. The equipment controller 14 preferably includes an on/off switch 36.

Figure 3:
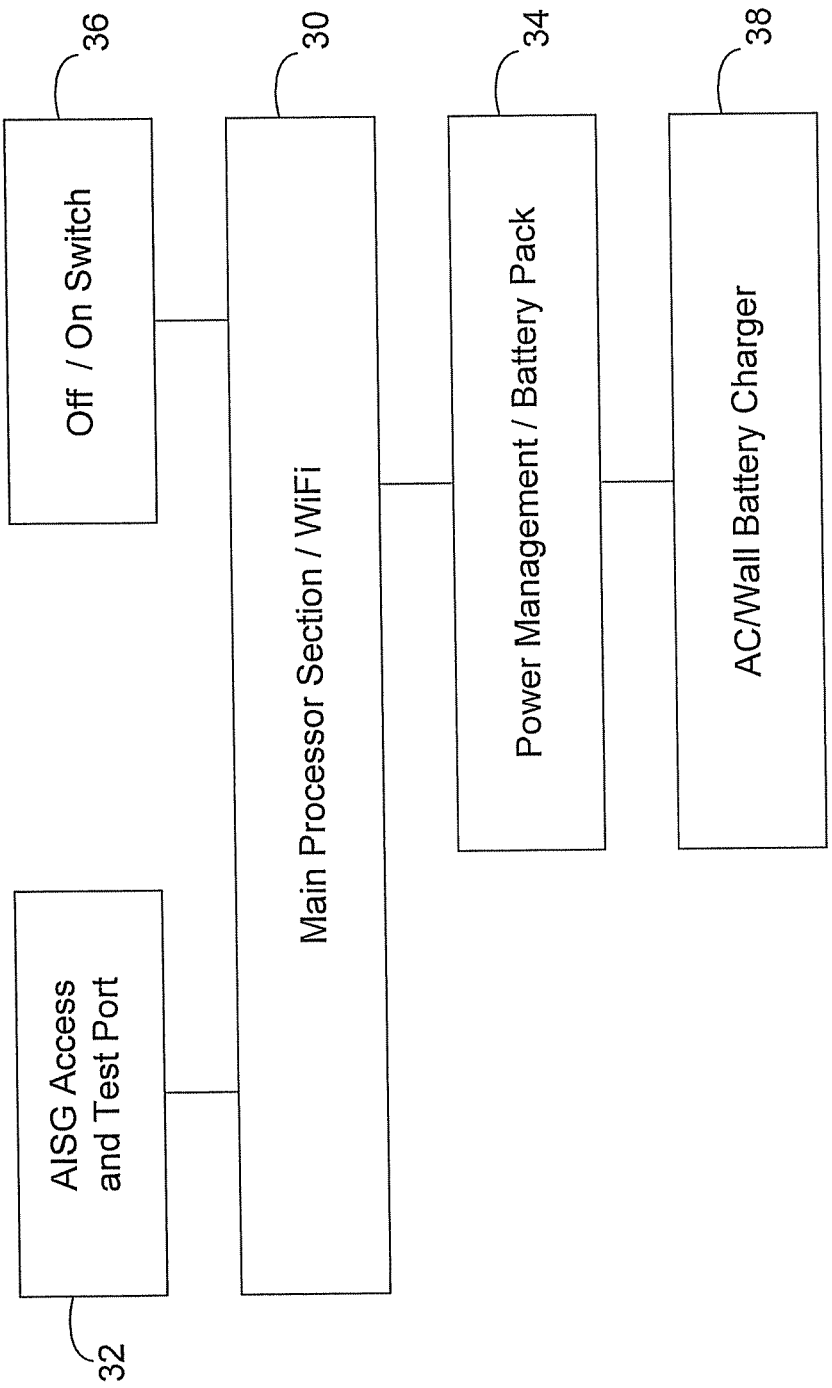
FIG. 3 is a block diagram of an equipment controller according to one example of the present invention.

The equipment controller 14 may include various hardware blocks. FIG. 3 illustrates one example of how hardware may be arranged in an equipment controller 14. In this example, a main processor section 30 is connected to a power management/battery pack 34. The main processor section 30 may be implemented on a circuit board as a complete system on a module. In this example, the main processor section 30 also comprises a Wireless Access Point. The Wireless Access Point may comprise a Wi-Fi access point. Alternatively, a wired USB connection may be provided. The main processor section 30 is capable of receiving communications vial the Wireless Access Point (or USB connection), converting the commands to serial communications suitable for an RS 485 network, and communicating to any AISG 1.0 and 2.0 devices via AISG Access and Test Port 32. In one example, the main processor 30 has the hardware ability to do diagnostic testing on the AISG interface. Alternatively, the main processor section may access an embedded command or test routing upon receipt of a command over the Wireless Access Point. A block diagrams of an exemplary main processor board is provided in FIG. 4.

The power management/battery pack 34 may further be connected to a battery charger 38. Any suitable battery pack may be used. In one example, the power management/battery pack 34 may further comprise a NIMH smart battery pack with fuel gauge, sub-system. Preferably, the battery pack will incorporate a thermal fuse and a current fuse for protection.

Figure 4:
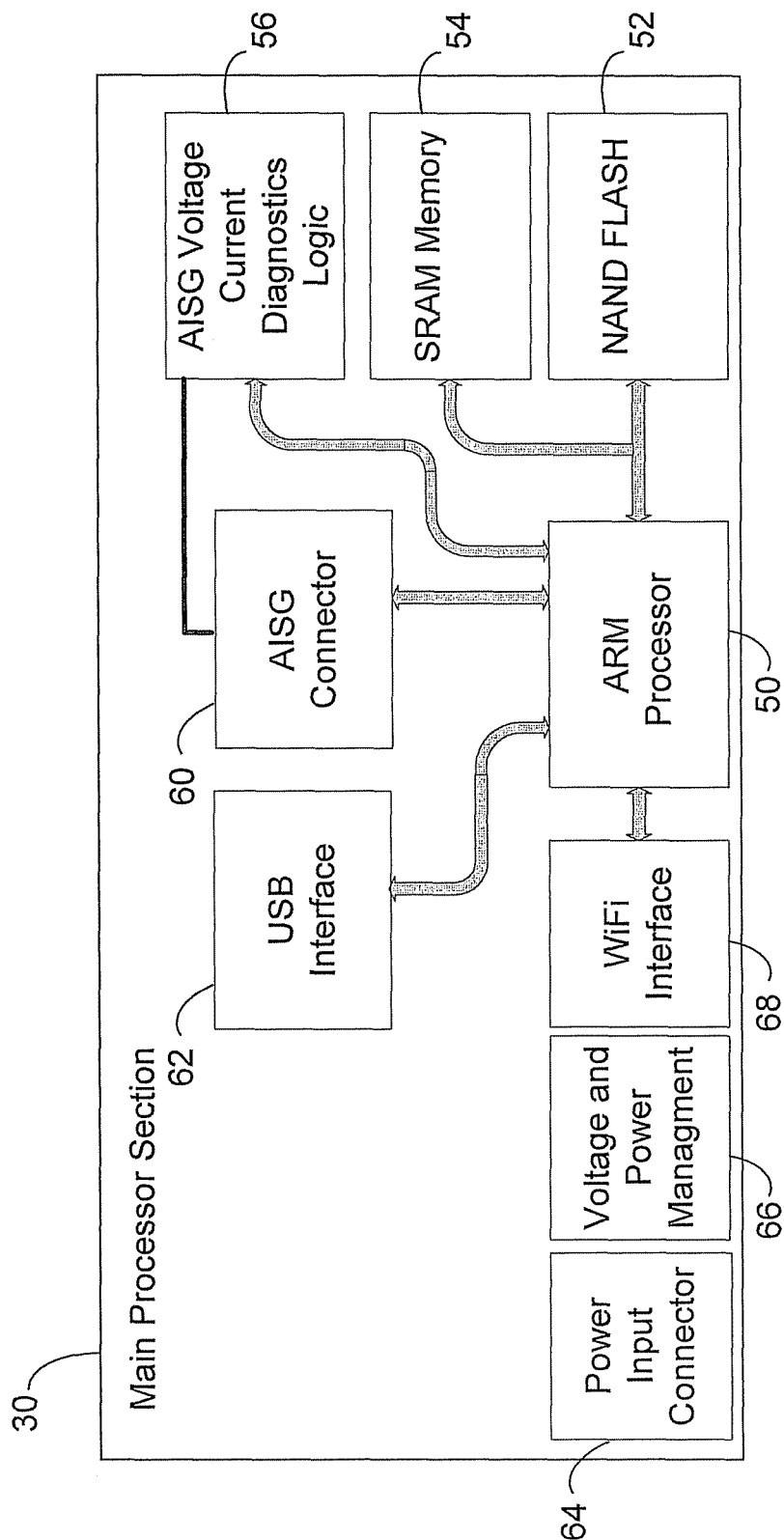
FIG. 4 is a block diagram of one example of a main processor subsystem of an equipment controller according to one example of the present invention.

One example of a main processor subsystem 30 is illustrated in FIG. 4. The main processor subsystem 30 of this example includes a processor 50, a storage memory 52, working memory 54, AISG diagnostics logic 56, AISG connectors 60, USB interface 62, power input connector 64, voltage and power management 66, and a Wi-Fi communications circuit 68.

The processor 50, in one example, is an ARM-based processor. Because no graphical display, GPS, camera, or graphical user interface is provided on the equipment controller 14, the processor may be selected for low cost and low power consumption. For example, a K20P100M microcontroller from Freescale Semiconductor is suitable. The K20P100M has a Cortex M4 core and operates at about 120 MHz.

The storage memory 52 preferably comprises NAND Flash memory. The NAND Flash memory may include a high density 2 G-bits, low power, 1.8 Volt memory. This storage memory 52 may be used to store the operating system (if necessary). Additionally, the storage memory 52 may be used to store antenna configuration files and firmware upgrades for tower top RET, TMA and CAD devices.

The working memory 54 may comprise RAM memory. In one example, the main board includes 1 Gig-bit of double data rate, low power, 1.8 Volt, 133 MHz, volatile random access memory. This DDR memory is arranged in a 32 Meg× 32 bits wide (8 Meg×32-bit×4 banks).

In one example, voltage and power management 66 may comprise an integrated power management IC for applications which require multiple power rails. The power management IC may provide three highly efficient, step-down converters targeted at providing the core voltage, peripheral, I/O, and memory voltage rails in a processor based system. In the equipment controller 14 the power management IC provides 1.45V, 1.8V, and the 2.5V voltages to run the main processor subsystem 30. This power management IC manages the low power modes of the processor. The low power modes include Run, Wait, Doze, Retention state, Deep Sleep, and Hibernate modes.

The Wi-Fi communications circuit 68, in this example, may comprise a Wireless Access Point that complies with the IEEE 802.11 family of standards. Preferably, the Wi-Fi communications circuit is configured to limit access and provide encrypted communications, such as with the WEP, WAP, and WAP2 security protocols. The Wi-Fi communication circuit may include router functionality. Alternatively, the Wi-Fi communication circuit may be configured to establish ad hoc connections with one wireless device at a time. In alternative embodiments, other wireless technologies, such as Bluetooth circuitry, may be substituted for the Wi-Fi communications circuit. In another alternative, USB may be used to establish communications between the equipment controller 14 and a handheld wireless device 12. In another alternative, a combination of the above technologies may be used.

AISG Connectors 60 on the main processor subsystem 30 preferably includes two standard 8-pin, AISG connectors, male AISG Connector 24 and female AISG Connector 26. The female AISG Connector 26 may also be used to output the RS-485 interface from the equipment controller 14 per the AISG 1.0 and 2.0 protocol and 24 volts to power a RET/TMA device. The male AISG Connector 24 may be used for electrical diagnostics at the physical layer. The male AISG Connector 24 interface may be used to check an AISG cable for opens, shorts, and to check to see if there is continuity on the RS-485 signal.

AISG diagnostics logic 56 is provided to help a service technician diagnose problems with any module hooked up to the AISG Connectors 60. This circuitry will monitor the voltage and current (power) of the 24 volt supply from the female AISG connector 26. It will also monitor for a short circuit condition on the RS-485 interface. The equipment controller 14 may also be configured to reset a RET device by turning off/on the power without needing to physically remove the connector.

In one example, the processor 50, and associated software and memory, is configured to receive AISG commands from the Wi-Fi communications, convert those commands to be compliant with the physical layer of the AISG standards, and communicate those commands on AISG networks attached to the AISG connectors. Communications received on the AISG connectors are formatted for transmission over the Wi-Fi circuit and are transmitted back to the wireless handheld device 12. In this example, the equipment controller 14 acts like a modem, where commands and responses pass through the equipment controller 14. In another example, certain diagnostic routines and other commands may be embedded in the equipment controller 14. For example, the AISG diagnostics module 56 may include a routine for executing electrical diagnostics at the physical layer, as described above. In this example, a simplified high-level command from the wireless handheld device 12 will be sufficient to initiate a more complex set of communications between the equipment controller and devices on the AISG bus, thereby reducing communications loads on the Wi-Fi circuitry and reducing complexity of the Application operating on the wireless handheld device 12.

The main processor section may also include a diagnostic port (not shown). The diagnostic port may be used for debug purposes used by engineering. The diagnostic port includes RS-232, RS-485, reset, voltages and other nets used for debugging the main processor subsystem 30. Additionally, a JTAG test connector used for software debugging may be provided. Male AISG connector 24 and a female AISG Connector 26 may also be on the main board.

Figure 5:
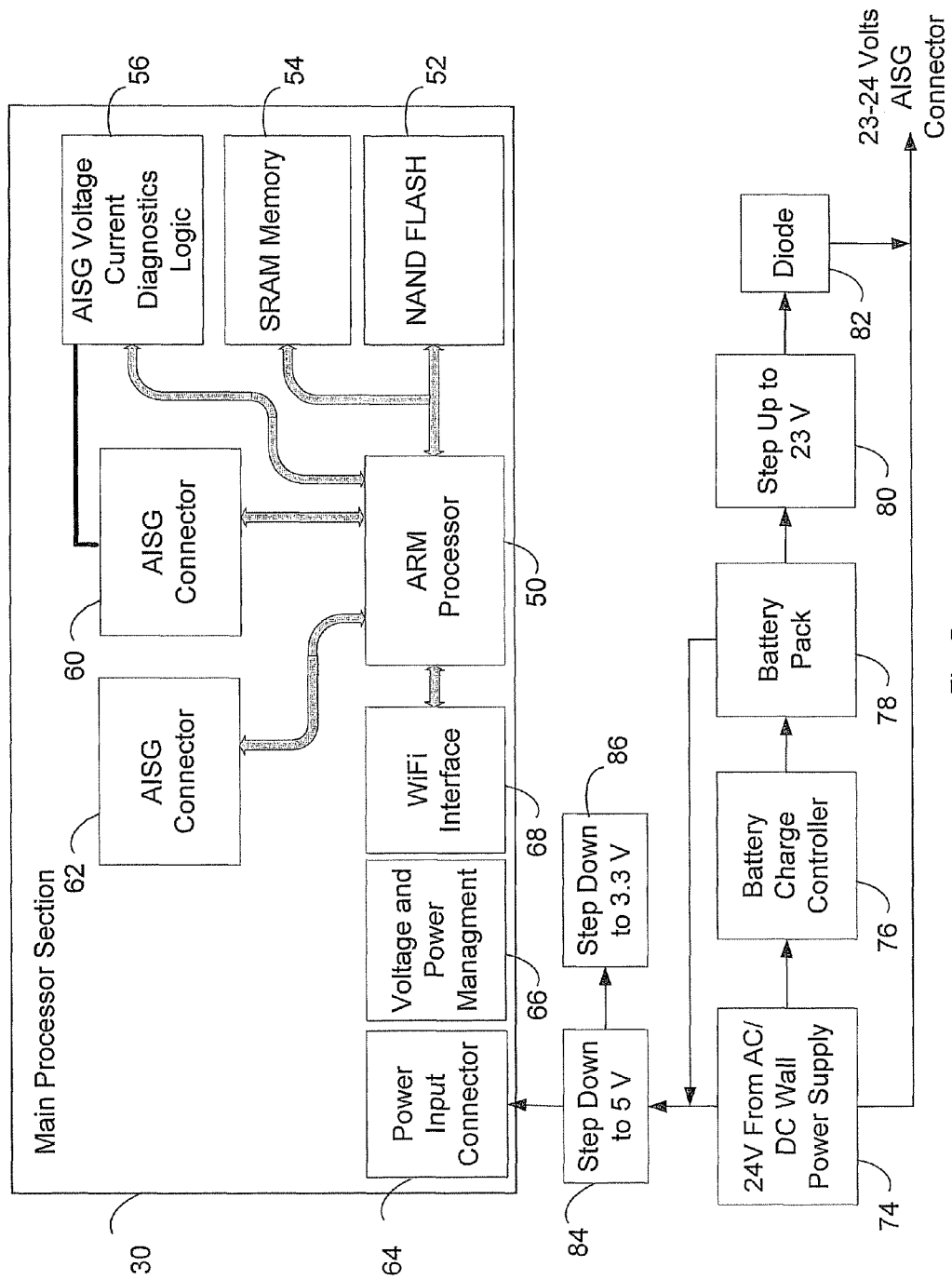
FIG. 5 is a block diagram of an example of a power management arrangement for a Master Antenna Controller according to one example of the present invention.

An alternate embodiment of main processor subsystem 30 is illustrated in FIG. 5. This example includes features of the power management subsystem 34. The processor 50, storage memory 52, working memory 54, AISG diagnostics logic 56 and AISG Connectors 60 are largely the same as the embodiment of FIG. 4, and the descriptions of such are incorporated by reference. This example also illustrates additional features of power management, including a 24 Volt input from an AC to DC wall power supply 74, a battery charge controller 76 coupled to the 24 VDC input from wall power supply 74, a battery pack 78, a step up converter 80, and a diode 82. The AISG interface may also be powered directly by the 24 VDC input, if the equipment controller 14 is plugged into the wall charger when in use. Also shown is a step down voltage converter 84 to step the voltage down from the battery voltage (or wall charger voltage) to 5 VDC. Also shown is a step down converter 86 to step down from 5 VDC to 3.3 VDC, and a DC to DC converter 88, which provides output voltages of 1.3 V, 1.8 V, 2.5 V and 2.8 V from a 5 V input.

The battery charge controller 76 may be coupled to the 24 VDC input. The step up converter 80 may convert the battery voltage to voltage suitable for the AISG interface. The wall power supply may be any suitable supply. In one example, the wall type power supply is an off the shelf, 60 watt, 24 volts DC out power supply.

The equipment controller 14 is configured through hardware and software to include the following features\functionality:
  AISG line device communication, testing, and scanning.
  Diagnostic for monitoring voltage and current reading on the AISG line.
  Ability to power off the AISG line without disconnecting the AISG connection.
  AISG protocol for AISG line devices, including AISG messaging.
  Wireless interface for communications with a smartphone/tablet device.

Figure 6:
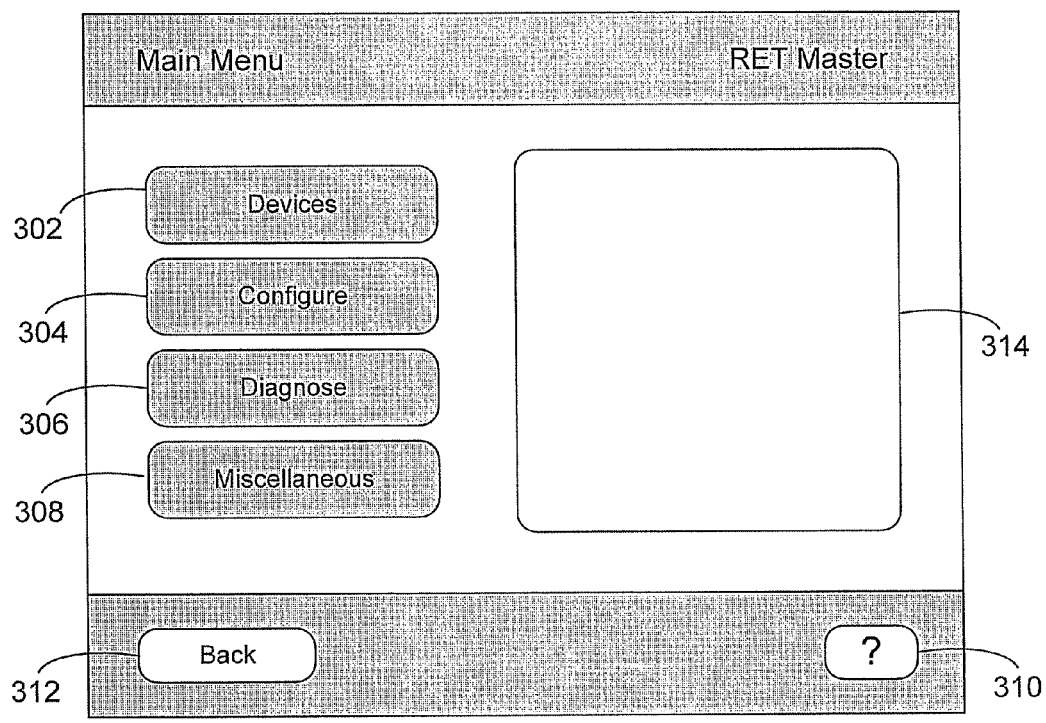
FIG. 6 is an exemplary screen shot of an Application for use with a Master Antenna Controller according to one example of the present invention.

A RET Master Application may be installed to operate on the handheld wireless device 12. The RET Master Application may include a User Interface ("UI") system that will allow the user to navigate between the various components. For example, FIG. 6 illustrates one example of a "main menu" screen shot 300 of the display of the handheld wireless device 12. The main menu provides virtual buttons for selecting activities. The buttons include Devices 302, Configure 304, Diagnose 306 and Miscellaneous 308. Also included are buttons for help ("?") 310 and Back 312. An image area 314 may be used to display an image, such as a photograph of the installation being serviced.

Figure 7:
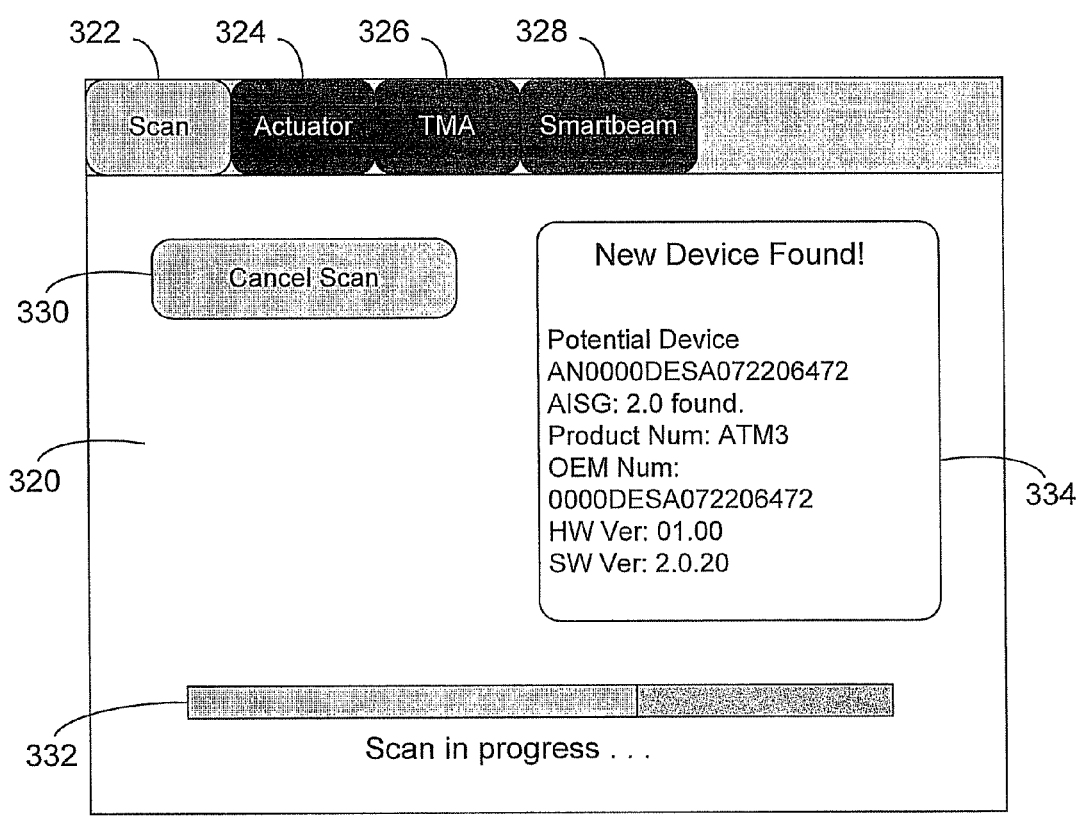
FIG. 7 is another exemplary screen shot of an Application for use with a Master Antenna Controller according to one example of the present invention.

FIG. 7 illustrates one example of a scan process screen 320. Scan process screen 320 includes virtual buttons for Scan 322, Actuator 324, TMA 326, and Smartbeam 328. The scan process screen 320 also includes a Cancel Scan 330 button and a scan progress bar 332. Information window 334 displays information regarding the devices found during the scan.

The RET Master Application is also responsible for providing access to features of the handheld wireless device 12, such as a digital camera, a GPS, a MEMS accelerometer, and, a fluxgate magnetic compass.

One use for the digital camera feature is to scan one or more bar codes. Bar codes having model numbers and serial numbers are typically found on equipment that is to be configured by the handheld wireless device 12 and equipment controller 14. In this example, the RET Master Application will activate the digital camera feature on the handheld device 12. A technician may use the display of the handheld device 12 to frame the bar code of the equipment to be configured. In one example, the equipment to be configured may be an antenna. In another example, the equipment may be an actuator associated with an antenna. The technician may then cause the handheld device to acquire an image of the bar code. The RET Application, and/or software associated with the digital camera or operating system of the handheld device 12, may then "scan" the image and convert the image of the bar code into an alpha-numeric model number and/or serial number. Multiple bar codes may be acquired in this way.

The RET Application may then use the model number(s) and/or serial number(s) to retrieve appropriate configuration parameters for the particular equipment that is to be configured. Preferably, the configuration parameters are stored in a look-up table on the handheld device 12. The look-up table may be a part of the RET Application. In this example, the RET Application may be updated periodically. In one alternative, the configuration parameters may be stored on a remote server, which may be accessed by the RET Application via a mobile communication link (e.g., cellular telephony data). In another example, the configuration parameters may be stored locally, but if a data communication path is available, the RET Application may check whether updated configuration parameters exist on a server before configuring a given item of equipment. This example allows the use of the RET Applications in areas where cellular data communication is not available, yet allows the latest configuration to be downloaded if cellular communication is available.

Once the configuration parameters have been retrieved, the RET Application may configure a selected item of equipment by transmitting commands to the equipment controller 14 via the Wi-Fi interface on the handheld wireless device 12 and the Wi-Fi communications circuit 68 of the equipment controller 14. The equipment controller 14 then converts the received commands so that they are compatible with the physical layer of the AISG standards, and communicates the commands to the selected equipment. By doing the above based on a scanned-in model number(s) and/or serial number(s), the configuration of the equipment is much more reliably accomplished.

Figure 8:
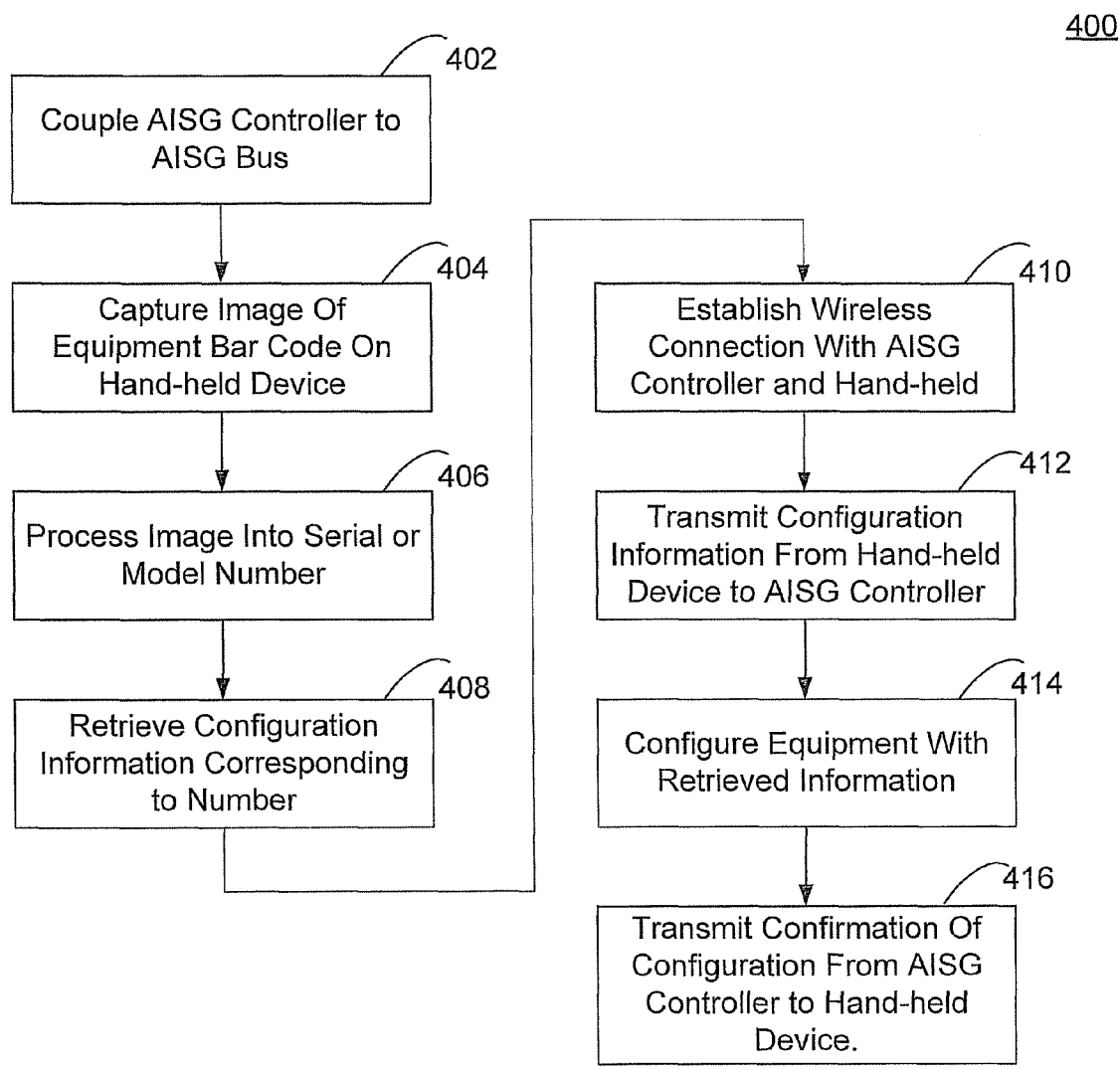
FIG. 8 is a flow chart of one example of a method of configuring equipment using a Master Antenna Controller according to one example of the invention.

In use, one function of the Master Antenna Controller System 10 is to control RET antennas. Referring to FIG. 8, an AISG-Compliant Controller may be coupled to an AISG bus in step 402. For example, an equipment controller 14 may be connected to a bus via the AISG connectors 24 and/or 26. In step 404, the hand-held wireless device 12 may be used to capture an image of a bar code label on an item of equipment to be configured. In step 406, the image may be processed into a serial number and/or model number. In step 408, the handheld wireless device 12 may retrieve configuration information based on the number from the captured bar-code image.

In step 410, a wireless connection is established between the handheld wireless device 12 and an AISG controller, such as equipment controller 14. For example, the equipment controller 14 may activate the Wi-Fi communications circuit 68. The wireless handheld device 12 may then establish a connection with the equipment controller 14 via the Wi-Fi communications circuit 68. It should be noted that not all steps must be performed in order, for example, images of bar codes may be captured before the equipment controller 14 is coupled to the AISG bus.

In step 412, the retrieved configuration information is transmitted from the hand-held wireless device to the AISG controller. In step 414, the AISG Controller configures the equipment identified by the number from the captured bar code. This step may also include the AISG Controller scanning for devices on the AISG bus to determine addresses, model numbers, and/or serial numbers of equipment attached to the AISG bus. In step 416, the AISG Controller returns information to the hand-held wireless device that the equipment has been successfully configured.

The RET Master Application presents graphical representations of antenna control commands via the user interface and receives selected commands in the user interface. In one example, as illustrated in FIG. 11, the RET Master Application is configured to display a screen from which a user may select a "scan" button. When the "scan" button is selected, the RET Master Application communicates commands to the equipment controller 14 to initiate a scan process. The equipment controller 14 opens scan communication onto the bus. When an actuator is found, additional information is queried on the device. Information concerning the located devices is communicated from the equipment controller 14 to the RET Master Application on the handheld wireless device 12. The RET Master Application registers the device onto its device list and propagates the information to the UI thread. The User Interface system updates the device UI list with the newly added device. As illustrated in FIG. 7, the information may be displayed in information window 334. The RET Master Application may be configured to periodically update the scan.

The Master Antenna Controller System 10 may also be configured to control non-AISG actuators. In this example, a user may select a non-configured actuator on the RET Master Application. The user selects the button "Edit Selected" which will bring up the "Edit Selected" dialog for the actuator. The user may then select an antenna model from an Antenna Model selection menu. The user selects a "Commit" button. RET Master Application looks up the information for the selected antenna model and configures the selected actuator. The RET Master Application then updates the "model" UI element with the configure antenna model for the actuator.

To activate a tilt actuator, in one example, from the device screen, the user selects the actuator to tilt. The user clicks on the "Move Selected" button. The RET Master Application launches the "Move Selected" form. The user provides a tilt value in the tilt UI element. The user clicks on the "Commit" button. The RET Master Application disables all UI-enabled elements on the "Move Selected" form. The RET Master Application sends the command to tilt the actuator. The RET Master Application updates the current tilt value for the actuator. The RET Master Application enables the UI-enabled elements on the "Move Selected" form. Other movements of the RET antenna (e.g., Pan) may be controlled in a similar manner.

The RET Master Application may include a Close-Out-Package Wizard, which will allow technician crews to create standardized close out packages with a few clicks. The close-out package is a predefined report documenting that the antennas in an associated cell tower are installed and operating according to the requirements of a wireless operator. The Close-Out Package Wizard significantly reduces the time required of the technicians to prepare the close out packages. Also, the wizard provides a standardized the close out package format to ensure same format is used by all technician crews.

The close out package may include the following information: latitude/longitude coordinates of the site, as provided by GPS circuitry on the handheld wireless device, electrical diagnostic information obtained by the equipment controller 14 and communicated to the handheld wireless device 12; antenna/antenna controller configuration information as configured by the RET Application based on scanned bar codes on the configured equipment; site photographs, as taken by a digital camera that is resident on the handheld wireless device 12; images of bar codes of equipment installed at the site, obtained using the digital camera resident on the handheld wireless device 12, antenna azimuth orientation, as obtained from a compass resident on the handheld wireless device 12, mechanical alignment of an antenna, such as mechanical pre-tilt, as obtained from a MEMS accelerometer resident on the handheld wireless device 12, installation instructions and requirements, as may be presented to a field technician on the on the handheld wireless device 12, notes and observations by field technicians, as may be entered on the wireless handheld device 12 by way of a virtual keyboard, voice recording, voice recognition, or other suitable technology, and other information that may be collected via the equipment controller 14 or sensors on the handheld wireless device 12.

Figure 9:
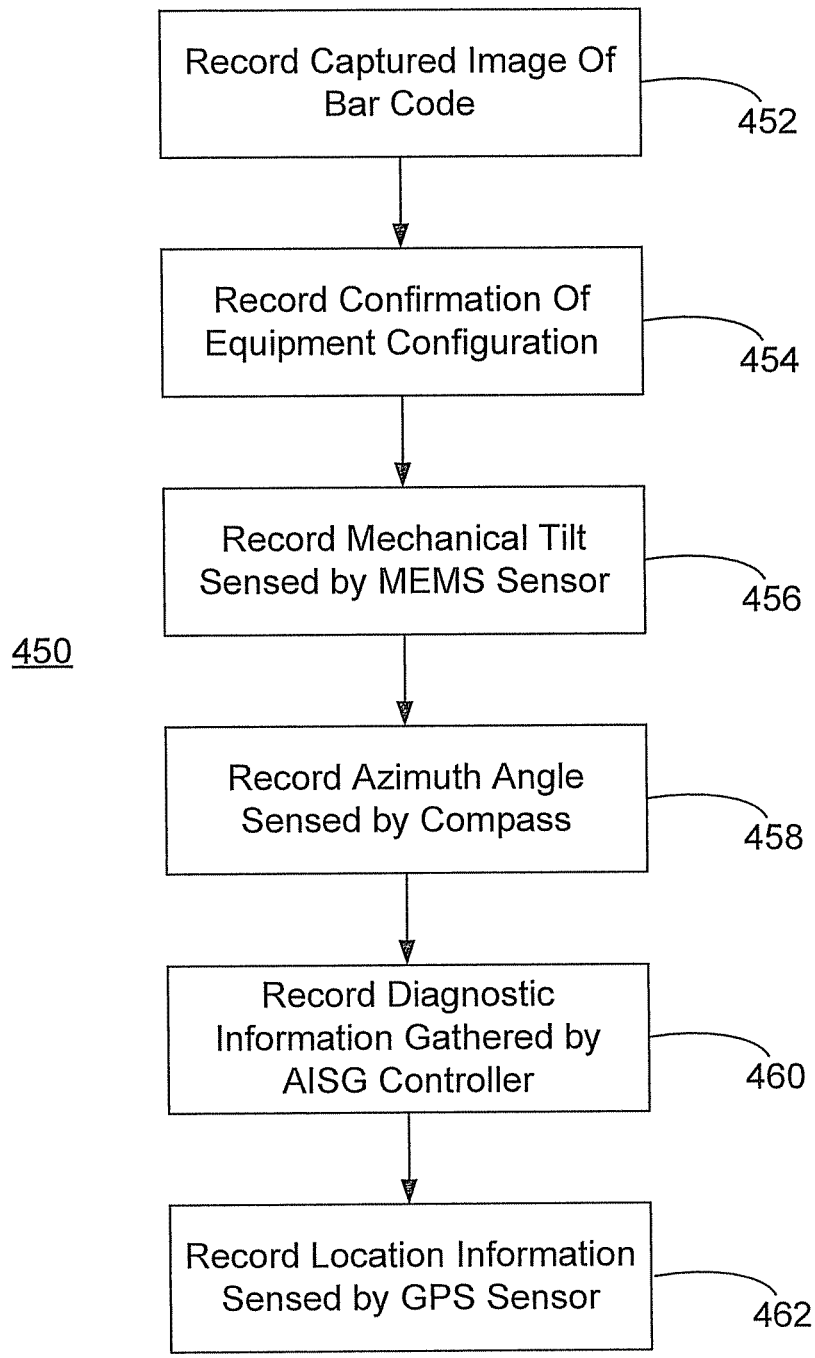
FIG. 9 is a flow chart of one example of a method of creating a close-out package according to one example of the present invention.

An exemplary process of generating a close-out package 450 is illustrated in FIG. 9. In step 452, a captured bar code image is recorded. In step 454, a confirmation of equipment configuration is recorded. Preferably, the confirmation is received wirelessly from the equipment controller 14. In step 456, a mechanical tilt is sensed by a MEMS Sensor and recorded. In step 458, an azimuth angle of installed equipment is sensed by a compass and recorded. In step 460, diagnostic information gathered by an AISG controller such as equipment controller 14 is recorded. In step 462, location information is sensed by a GPS sensor and recorded. These steps need not be performed in the order given in the example above, nor is the above example a complete or exclusive list of steps that may be performed to prepare a close-out package.

It is contemplated that the information in the steps above be recorded without manual entry of the information. For example, a step to capture tilt information could be initiated by manually tapping virtual button on a display of the handheld wireless device 12 to indicate that the hand-held device is aligned with the tilt of the installed equipment. However, the information captured by the MEMS sensor would be directly recorded in the close-out package without requiring service personnel to make a note of the information and manually enter the information. It should also be noted that the above does not exclude the inclusion of additional information that is manually entered by virtual keyboard or voice notes such as observations by service personnel made during installation and/or configuration of equipment.

What is claimed is:

1. A system for controlling tower-mountable communications equipment, comprising:
   a. an equipment controller; comprising:
      1. a wireless interface;
      2. an AISG interface; and
      3. a first processor, configured to access an AISG protocol stack and to effect communications between the wireless interface and the AISG interface; and
   b. a hand-held wireless device; comprising:
      1. a wireless interface configured to establish wireless communication with the equipment controller;
      2. an image sensor; and
      3. a second processor being configured with instructions to operate the image sensor to capture an image of a bar code associated with an item of tower-mountable communications equipment, to process the image of the bar code into a number, to retrieve configuration information associated with the number, to transmit the configuration information to the equipment controller, to receive confirmation information that the configuration information has been successfully applied, and to generate a close-out package including: the images of bar codes of tower-mountable communications equipment installed at a given site, retrieved configuration information corresponding to the tower-mountable communications equipment, and confirmation information that the configuration information has been successfully applied to the tower-mountable communication equipment.

2. The system of claim 1, wherein the second processor is configured to transmit the configuration information to the equipment controller by preparing commands to configure the tower-mountable communications equipment based on the configuration information and transmitting the commands to the equipment controller.

3. The system of claim 1, wherein the hand-held wireless device further comprises a display, and the second processor is further configured to provide a graphical user interface for controlling tower-mountable communications equipment on the display.

4. The system of claim 1, wherein the tower-mountable communications equipment comprises an antenna having an AISG-compliant controller.

5. The system of claim 1, wherein the tower-mountable communications equipment comprises an antenna, and the hand-held controller further comprises a MEMS accelerometer, wherein the second processor is further configured to record a mechanical tilt of the antenna as measured by the MEMS sensor in the close-out package.

6. The system of claim 1, wherein the tower-mountable communications equipment comprises an antenna, and the hand-held controller further comprises a compass, wherein the second processor is further configured to record a azimuth angle of the antenna as measured by the compass in the close-out package.

7. The system of claim 1, wherein the second processor is configured to retrieve the configuration information associated with the number from a locally-stored repository of configuration information.

8. The system of claim 7, wherein the second processor is configured to check for updated configuration information from a remote server if a communications link to the remote server is available.

9. The system of claim 1, wherein the second processor is configured to retrieve the configuration information associated with the number from a remote server.

10. A method of configuring tower-mountable communications equipment, comprising:
   a. capturing an image of a bar code corresponding to an item of tower-mountable communications equipment on a hand-held device;
   b. the hand-held device processing the image of the bar code into a number associated with the item of tower-mountable communications equipment;
   c. the hand-held device retrieving configuration information associated with the item of tower-mountable communications equipment by using the number;
   d. coupling an equipment controller to the item of tower-mountable equipment by an AISG communications link;
   e. establishing wireless communication between the hand-held device and the equipment controller;
   f. the equipment controller performing a scan of devices attached to the AISG communications link to determine an address of the item of tower-mountable communications equipment based on the number;
   g. the hand-held transmitting the configuration information to the equipment controller;
   h. the equipment controller translating the configuration information into AISG-compliant commands;
   i. the equipment controller transmitting the AISG-compliant commands to the item of tower-mountable communications equipment.

11. The method of claim 10, wherein the step of retrieving configuration information further comprises the hand-held device checking for updated configuration information from a remote server if a communications link to the remote server is available.

12. The method of claim 10, further comprising the step of the hand-held device creating a close-out package including the images of bar codes of tower-mountable communications equipment installed at a given site, retrieved configuration information corresponding to the tower-mountable communications equipment, confirmation information that the configuration information has been successfully applied to the tower-mountable communications equipment.

13. The method of claim 12, wherein the step of creating a close-out package further includes measuring a mechanical tilt of the tower-mountable communications equipment with a MEMS sensor on the hand-held device and including the mechanical tilt in the close-out package.

14. The method of claim 12, wherein the step of creating a close-out package further includes measuring an azimuth angle of the tower-mountable communications equipment with a compass on the hand-held device, and recording the azimuth angle in the close-out package.

15. The method of claim 12, wherein the step of creating a close-out package further includes determining a location of the tower-mountable communications equipment with a GPS sensor on the hand-held device, and recording the location information in the close-out package.

16. The method of claim 12, wherein the step of creating a close-out package further includes measuring an azimuth angle of the tower-mountable communications equipment with a compass on the hand-held device, and recording the azimuth angle in the close-out package.

17. The method of claim 12, wherein the step of creating a close out package further comprises the steps of the equipment controller transmitting diagnostic information concerning the tower-mountable communications equipment to the hand-held device, and recording the diagnostic information in the close-out package.

18. The method of claim 10, wherein the steps of coupling an equipment controller to the tower-mountable communications equipment occurs first.

\* \* \* \* \*